(12) United States Patent
Rubio (10) Patent No.: US 8,347,403 B2
(45) Date of Patent: Jan. 1, 2013

(54) SINGLE POINT AUTHENTICATION FOR WEB SERVICE POLICY DEFINITION (75) Inventor: Ramon Rubio, Downey, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1402 days.

(21) Appl. No.: 11/750,509

(22) Filed: May 18, 2007

(65) Prior Publication Data
US 2008/0148345 A1 Jun. 19, 2008

Related U.S. Application Data (63) Continuation-in-part of application No. 11/613,128, filed on Dec. 19, 2006.

(51) Int. Cl.
G06F 7/04 (2006.01)
(52) U.S. Cl. ............ 726/28; 726/1; 713/168
(58) Field of Classification Search ......... 726/1, 28; 713/168
See application file for complete search history.

(56) References Cited

U.S. PATENT DOCUMENTS

| 6,301,661 | B1 | 10/2001 | Shambroom | |
|---|---|---|---|---|
| 2003/0177389 | A1* | 9/2003 | Albert et al. | 713/201 |
| 2004/0088587 | A1 | 5/2004 | Ramaswamy et al. | |
| 2004/0139319 | A1* | 7/2004 | Favazza et al. | 713/168 |
| 2005/0177635 | A1* | 8/2005 | Schmidt et al. | 709/226 |
| 2005/0177724 | A1 | 8/2005 | Ali et al. | |
| 2005/0251853 | A1 | 11/2005 | Bhargavan et al. | |
| 2005/0256947 | A1 | 11/2005 | Devarakonda et al. | |
| 2006/0015625 | A1 | 1/2006 | Ballinger et al. | |
| 2006/0031683 | A1 | 2/2006 | Marion et al. | |
| 2006/0041669 | A1 | 2/2006 | Bemmel et al. | |
| 2006/0075465 | A1* | 4/2006 | Ramanathan et al. | 726/1 |
| 2006/0080352 | A1* | 4/2006 | Boubez et al. | 707/102 |
| 2006/0235973 | A1* | 10/2006 | McBride et al. | 709/226 |

OTHER PUBLICATIONS

A community authorization service for group collaboration ;Policies for Distributed Systems and Networks, 2002. Proceedings. Third International Workshop ; Author(s): Pearlman, L. et al, Proceedings of the Third International Workshop on Policies for Distributed Systems and Networks (POLICY' 02) 0-7695-1611-4/02 © 2002 IEEE.*

* cited by examiner

Primary Examiner — Taghi Arani
Assistant Examiner — Jason Lee
(74) Attorney, Agent, or Firm — Canon U.S.A., Inc., IP Division (57) ABSTRACT A single point authentication component is provided that is responsible for authenticating incoming requests received via various mediums into a system of a plurality of Web services. The single point authentication component is configured to receive a request from a client for accessing one of the plurality of Web services and to determine and enforce security policies acceptable for accessing the requested Web service.

7 Claims, 8 Drawing Sheets

SINGLE POINT AUTHENTICATION FOR WEB SERVICE POLICY DEFINITION

CROSS REFERENCE TO RELATED APPLICATION

This application is a continuation-in-part of U.S. patent application Ser. No. 11/613,128, entitled "DYNAMIC WEB SERVICE POLICY BROADCASTING/ENFORCEMENT FOR APPLICATIONS," filed Dec. 19, 2006.

BACKGROUND OF THE INVENTION

1. Field of the Invention

The present invention generally relates to network systems and more particularly relates to a method and system for determining and enforcing policy attributes of Web servers and Web services.

2. Description of the Related Art

When Web services are provided over a network, security policies generally need to be employed to prevent unauthorized users from accessing Web servers and Web services. Currently Web services provided in JAVA application servers (e.g., WebLogic, WebSphere, JBoss, etc.) and in other environments may define a security policy on a per Web service basis. These security-policy files define the types of security tokens (e.g., KerberosToken, X509Token, SamlToken, etc.) that the Web service will accept. In general, security tokens are used in the web service environment to identify a client (e.g., via credentials). The Web service provider can use this token to authenticate/validate a client based on the credentials set in the security token. The security policy settings of a Web service are retrieved by Web service clients through use of WS MetadataExchange protocol or other out-of-band methods. The security policy discovery process usually takes place during Web service discovery process but may also occur after the Web service has been discovered during run time.

SUMMARY OF THE INVENTION

An embodiment of the present invention is directed a single point authentication component that is responsible for authenticating incoming requests received via various mediums into a system of a plurality of Web services. The single point authentication component is configured to receive a request from a client for accessing one of the plurality of Web services and to determine and enforce security policies acceptable for accessing the requested Web service.

Further features and aspect of the present invention will become apparent from the following detailed description of exemplary embodiments with reference to the attached drawings.

DESCRIPTION OF THE EMBODIMENTS

Exemplary embodiments of the present invention are described below with reference to the drawings. It is noted that the references to "an" or "one" embodiment of this disclosure are not necessarily directed to the same embodiment, and such references mean at least one.

Figure 1:
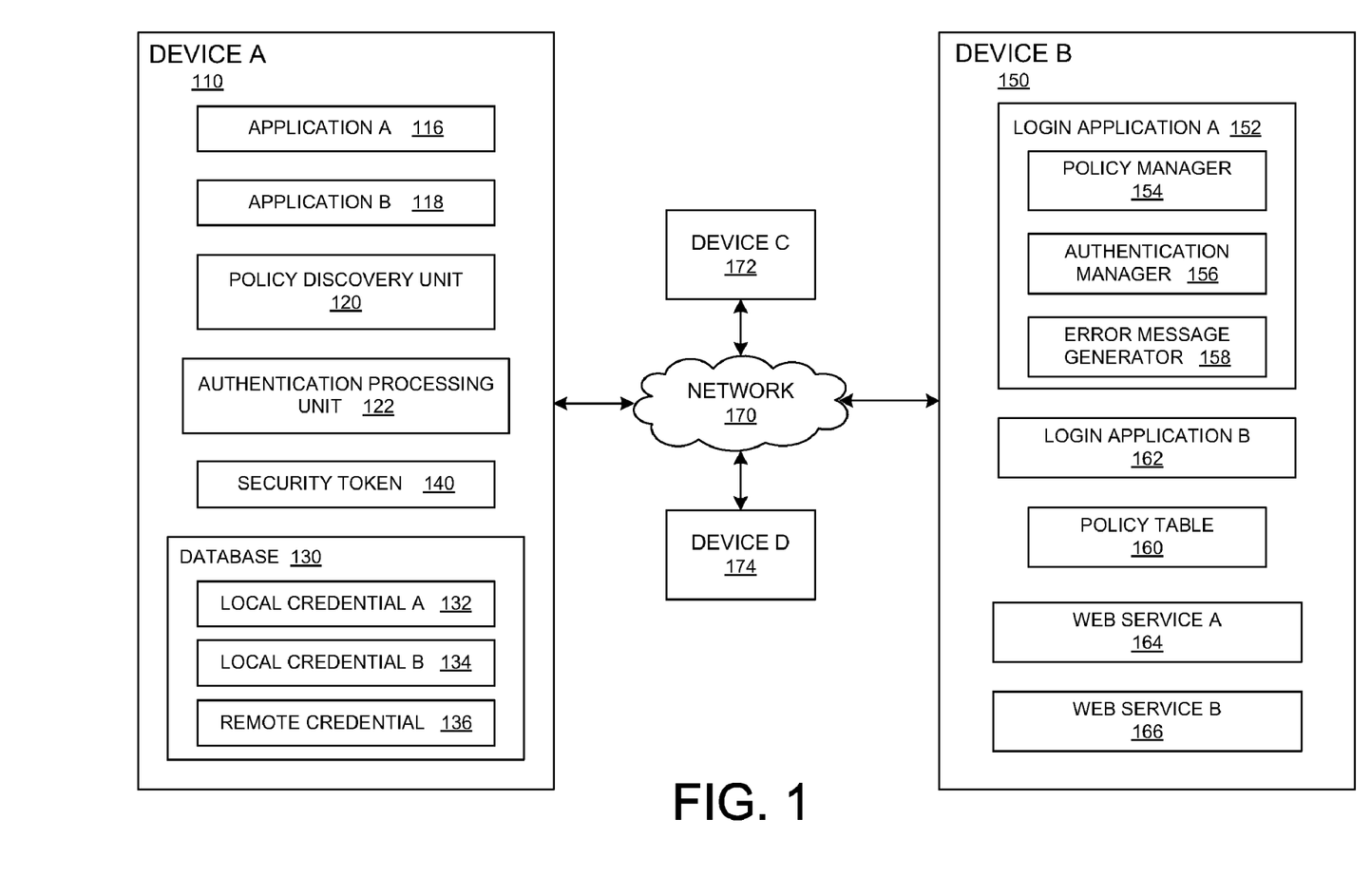
FIG. 1 is a block diagram of a network system according to an embodiment of the present invention.

First, a network system will be described which implements operations for discovering and enforcing security policy attributes of servers and services performed by the servers according to an embodiment of the present invention. FIG. 1 is a block diagram showing a simplified representation of a network system according to an embodiment of the present invention.

The system generally includes one or more devices operatively coupled via a network. The system enables two devices to exchange security policies across the network. In one embodiment, the security policy information is embedded in a notification (e.g., error message) returned from a target server to which a client is seeking access. Based on the additional information embedded in the notification (e.g., error message), the client is able to identify the policy required by the target server.

In FIG. 1, the network system includes a number of devices 110, 150, 172, 174 (device A, device B, device C and device D) coupled to each other via a network 170. The network 170 may be realized, for example, by the Internet, a WAN (wide-area network) and/or a LAN (local-area network). Further, wired and wireless systems can both be applied to the network. Each of the devices 110, 150, 172, 174 may be realized, for example, by a server, a client computer, a multi-function device (e.g., equipped with scanning, printing and/or copying functional units), or any other suitable device capable of requesting and/or processing services over the network. Any suitable communication protocol may be used for establish communication between the devices 110, 150, 172, 174, such as, for example, HTTP (HyperText Transfer Protocol), Web service protocol, SOAP (Simple Object Access Protocol), and TCPIP.

For purposes of illustration, in an example described below, the device A is serving as a client and the device B is serving as a server (e.g., Web server capable of performing Web services). The device A (also referred to herein as "client" 110) includes a number of applications 116, 118 (application A and application B) that communicates with a policy discovery unit 120 and an authentication processing unit 122. Each of the applications 116, 118 executed by the client 110 can receive information regarding a user input and can establish communication with the device B (also referred herein as "Web server" or "server" 150) in response to the user input requesting access to one of the services performed by the server 150. When this occurs, an application (e.g., application 116) executed by the client 110 may initially use a local credential 132 maintained by the client 110 to access the server 150. In the case where the client 110 maintains a library of local credentials, the application 116 will select one of the local credentials 132, 134 for presenting to the server 150 based on, for example, information (e.g., identification or server-type information) associated with the requested server or information (e.g., identification or service-type information) associated with the requested service.

In an embodiment, the application 116 executed by the client 110 employs the policy discovery unit 120 to automatically determine security policy associated with the requested server 150 and employs the authentication processing unit 122 to generate a remote credential 136 that complies with the security policy associated with the requested server. The remote credential 136 can be generated by the authentication processing unit 122 by acquiring information from the client user or using one of the local credentials 132, 134 selected based on the security policy information acquired by the policy discover unit 120.

The security policy information acquired by the policy discovery unit 120 can be associated with a login application (e.g., a single point authentication component) and/or a service provided by a server to which the client 110 is seeking access. In an embodiment, the security policy information acquired by the policy discovery unit 120 may include (1) the type(s) of authentication token accepted by a login application and/or a service provided the target server, (2) the name of the domain to which the target server is associated, (3) a list of trusted domain identification information, and (4) other claim(s) (e.g., custom property of token) associated with the login application. Based on the security policy information acquired by the policy discovery unit 120, the authentication processing unit 122 is configured to allow the client 110 to select and display a proper display screen (e.g., login screen) to acquire a credential that satisfies the policy definition(s) of the login application.

In one embodiment, the authentication processing unit 122 is capable of determining whether single-sign-on (SSO) functionality can be used to access the server 150 based on the security policy information acquired by the policy discovery unit 120. Additionally, the authentication processing unit 122 is capable of determining whether or not interactive-sign-on (ISO) is required. In one embodiment, when the security policy of the login application and/or Web service of the target server 150 does not match with any of the local credentials or local credential authentication types, the authentication processing unit 122 may determine that ISO is required to establish authentication between the client 110 and the Web server 150. If the authentication processing unit 122 determines that ISO is required, the authentication processing unit 122 will generate a pop-up window to prompt the client user to enter the information necessary for generating a proper credential complying with the security policy of the target server 150.

In an embodiment, the policy discovery unit 120 is capable of extracting, from a notification (e.g., error message) returned from the server 150, the security policy information associated with the login application 152 executed by the server 150. Alternatively or in addition to, the policy discovery unit 120 is capable of extracting, from the error message returned from the server 150, the security policy information associated with a service (e.g., Web service) provided by the server 150 to which the client 110 is seeking access. Based on the security policy information extracted by the policy discovery unit 120, the client application 116 in communication with the authentication processing unit 122 can generate and display a pop-up window to obtain the necessary information from the client user required for establishing authentication with the target server 150. Once the client application 116 acquires the necessary information from the user, the authentication processing unit 122 will use the information to generate a new request to authenticate with the server 150. Once the client 110 is granted access to the server 150 (e.g., by obtaining a security token), it can use the security token to securely communicate with the target server 150 as long as that security token is accepted by the server.

It is noted that the policy discovery unit 120 and the authentication processing unit 122 refer to software or a combination of software and hardware. For example, each of the policy discovery unit 120 and the authentication processing unit 122 may be realized, for example, by a process executed on a processor, programmable hardware, a program, and/or a computer. It is further noted that although the policy discovering unit 120 and the authentication processing unit are shown as being separate components from the applications 116, 118, it is noted that the policy discovery unit 120 and the authentication processing unit 122 can be incorporated in each individual application as a single application package.

As shown in FIG. 1, the server 150 includes a number of login applications 152, 162 (login application A, login application B) and a number of Web service applications 164, 166 (Web service A, Web service B). The server 150 can have varying levels of security policies for different login applications 152, 154 executable by the server. Thus, depending on which login application is executed by the server 110, the security policy requirements for accessing the server 110 may vary. There are a number of security policies that can be specified by each of the login applications 152, 162, such as for example, (1) an authentication requirement (e.g., to specify whether a client is required to be authenticated on the Web server prior to executing Web service operation), (2) the type of authentication mechanism used (e.g., NTLM, Kerberos, local), (3) an encryption requirement (e.g., to specify whether encryption is required when using Web service and type of encryption algorithm required), and (4) a signature requirement (e.g., to specify whether signature is required when using Web service and type of signature algorithm required).

Additionally, the server 150 includes a number of Web service applications 164, 166, each of which implements a particular function (Web service) that can be accessed by an external device. It is noted that although the Device B (server 150) is illustrated as a single device in FIG. 1, it is not necessary that the functional units (e.g., login applications and the Web service applications) reside in the same device. Thus, alternatively, for example, the login applications may be executed in a device separate from the device performing the Web service functions.

The server 150 can have varying levels of security policies for different Web service applications 164, 166 executable by the server. Thus, depending on which Web service application function is requested by the client 110, the security policy requirements for accessing the requested Web service may vary.

As shown in FIG. 1, the login application A 152 includes a policy manager 154, an authentication manager 156, an error message generator 158 and a policy table 160. The policy manager 154 is configured to enforce the security policy of the login application 152 and/or one of the Web services 164, 166 to which a client is seeking access.

When the login application A 152 is executed by the server 150, the policy manager 154 is configured to receive an incoming request from an external device (e.g., client 110) and examine it to determine if the request satisfies the security policy requirements of the login application A 152. In this regard, the policy table 160 is referenced by the policy manager 154 to acquire the information associated with security policy defined by the login application A and uses the acquired information to make the determination of whether or not the incoming request satisfies the policy requirements of the login application A 152. In cases where each of the Web services 164, 166 executable by the device B is assigned different levels of security policy, the policy manager 154 is capable of determining if an incoming request satisfies policy requirements of a requested Web service by looking up policy requirement information associated with the requested service stored in the policy table 160. Accordingly, the policy table 160 includes a set of security policies defined for each of the Web services 164, 166 executable by the server 150 as well as security policy defined for the login application 152.

As noted above, if an incoming request from the client 110 does not satisfy the policy applicable for the login application and/or the request Web service, the login application 152 is configured to inform the client 110 of its current security policy setting. This may be accomplished by the error message generator 158 generating a notification (e.g., error message) that contains policy information applicable for the currently executed login application (e.g., login application A 152) and/or the requested service. On the other hand, if the incoming request from the client 110 does satisfy the security policy of the currently executed login application and/or the Web service pertaining to the request, the authentication manager 156 will issue a security token to grant access to the client user.

Figure 2:
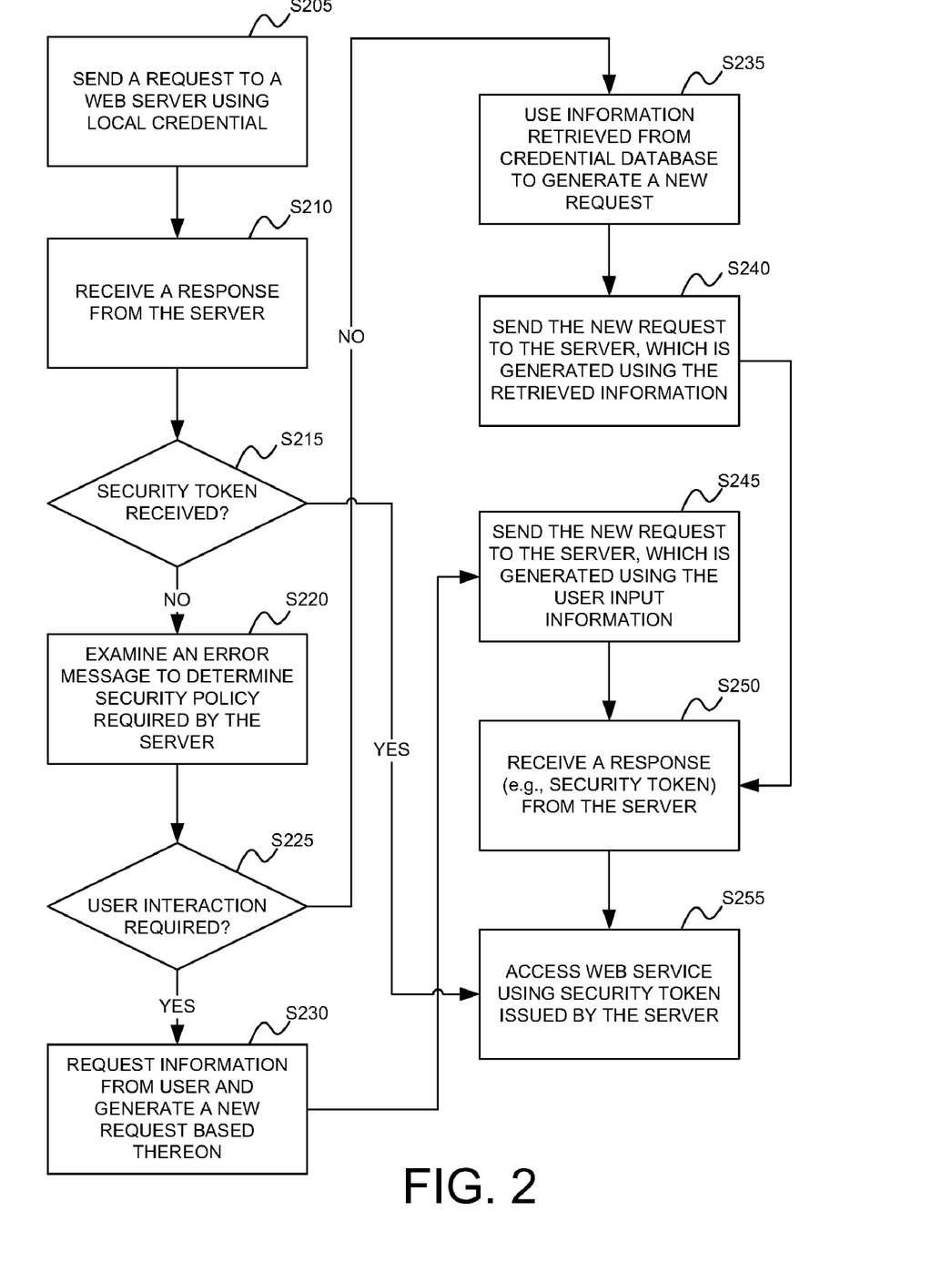
FIG. 2 is a flowchart diagram of operations performed by a client of the network system according to an embodiment of the present invention.

FIG. 2 is a flowchart illustrating operations performed by a client of the network system according to an embodiment of the present invention. In step S205, the client 110 transmits an access request to the server 150 to access a service provided by the server. The request may include identification information of one of the Web services 164, 166 executable by the server 150 to which the client user is seeking access.

Next, in step S210, the client 110 waits to receive a response from the server 150. The response returned by the server 150 may be a security token authenticating the client 110 and granting access to the requested Web service. The security token may be issued based on verification of the content (e.g., credential) of the request. Alternatively, the response returned by the server 150 may be a notification (e.g., error message) indicating that the client 110 is denied access for failing to comply with the security policy defined by the server 150.

Accordingly, in step S215, the client 110 determines whether or not the response returned by the server 150 includes a security token granting access to the requested Web service. If it is determined that the response includes a security token ("Yes" at step S215), the processing proceeds to step S255 where the security token is used by the client 110 to access the requested service during a service session. On the other hand, if it is determined that the response does not include a security token ("No" at step S215), the processing proceeds to step S220 where the policy discovery unit 120 examines the response (e.g., an error message) to determine security policy defined by the server 150. In an embodiment, the error message employs an XML (eXtensible Markup Language) to explicitly specify security policy defined by the server. In an accordance with an embodiment of the present invention, the response (e.g., error message) returned by the server may include one or more of the following: (1) information identifying a domain to which the server is associated, (2) a list of trusted domain identification information, and (3) information relating to a custom property of a token defined by a login application of the server.

Once the security policy information embedded in the error message has been extracted, the client 110 uses the security policy information to determine whether single-sign-on (SSO) is enabled or whether it needs to prompt the user to obtain information necessary for complying with the security policy of the server. More specifically, the security policy information determined by the policy discovery unit 120 of the client 110 is communicated to the authentication processing unit 122. Then in step S225, based on the examination of the security policy information, the authentication processing unit 122 of the client 110 determines if a user interaction is required to generate a new access request that complies with the security policy defined by the server 150. If it is determined that a user interaction is not required to generate a new access request ("No" in step S225), the processing proceeds to step S235 where the authentication processing unit 122 uses information associated with one of the local credentials 132, 134 retrieved from the database 130 to generate the new access request. For example, the database 130 maintained by the client 110 may include a library of credentials. In step S240, the new access request is sent to the server 150. On the other hand, if it is determined that a user interaction is required to generate a new access request ("Yes" in step S225), the processing proceeds to step S230 where the authentication processing unit 122 generates a pop-up window requesting the client user to input information necessary for generating the new access request. According to an embodiment, the information (e.g. (1) information identifying a domain to which the server is associated, (2) a list of trusted domain identification information, and/or (3) information relating to a custom property of a token defined by a login application of the server) included in the response (e.g., error message) returned from the server enables the client to select and display a proper login screen to acquire the credential that satisfies the policy definition(s) of the login application of the server. When the client 110 has acquired the necessary information through prompting the user, the client can then proceeds to the authentication operation by generating a new access request. Next, in step S245, the new access request is sent to the server.

In an embodiment, the client 110 uses Web Services Trust Language (WS-Trust) protocol to authenticate with the server 150. However, it is noted that any suitable authentication technique may be employed to authenticate the client 100 with the server 150, including using a standard token (e.g., Kerberos) or a custom token (e.g., SDL, NTLM, CPCA).

In response to the new access request sent by the client 110, the server 150 may return a security token that can be used by the client to access the requested service performed by the server. Accordingly, once the new access request has been sent to the server 150, the client 110 waits to receive a response back from the server in step S250. If the new access request sent by the client complies with the security policy specified in the error message, the server will authenticate the client and return a security token. The security token issued by the server can be used in steps S255 to access the requested Web service.

Figure 3:
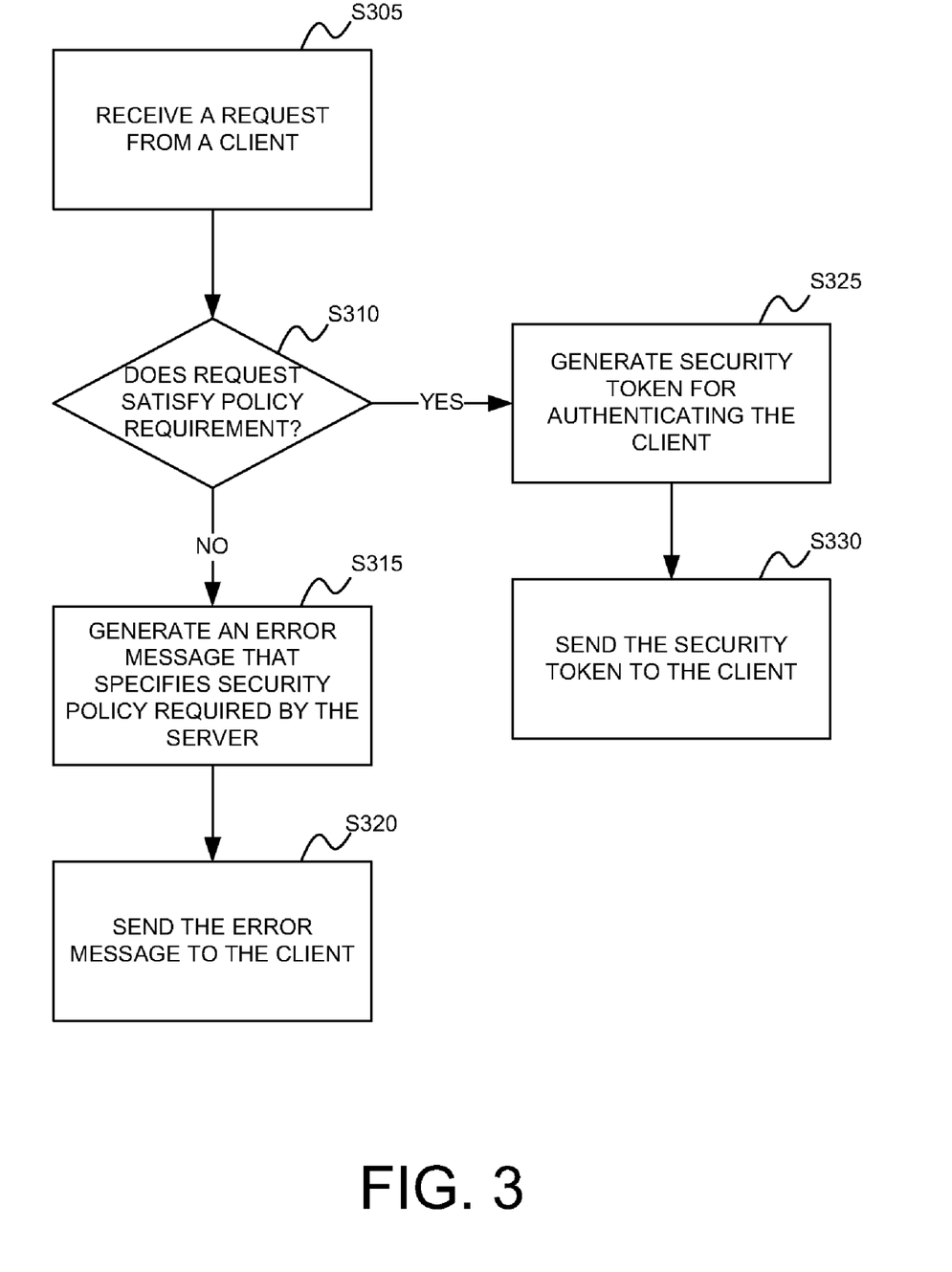
FIG. 3 is a flowchart diagram of operations performed by a server of the network system according to an embodiment of the present invention.

FIG. 3 is a flowchart illustrating operations performed by a server of the network system according to an embodiment of the present invention. In step S305, the server 150 receives an access request from the client 110. In an embodiment, the server is configured to authenticate the client based on verification of credential information attached to the request.

Accordingly, in step S310, the login application currently executed by the server 150 determines if the credential information attached to the request satisfies security policy requirements of the server. If the request fails to satisfy the security policy requirements ("No" at step S310), the processing proceeds to step S315. In step S315, the server 150 denies access to the client 110 and generates a notification (e.g., error message) informing that the request has been denied. Additionally, the notification (e.g., error message) includes information specifying security policy defined by the server 150 in accordance with an aspect of the present invention. As noted above, the notification generated by the server may include one or more of the following: (1) information identifying a domain to which the server is associated, (2) a list of trusted domain identification information, and (3) information relating to a custom property of a token defined by the login application of the server. Then, in step S320, the notification (e.g., error message) is sent to the client 110.

On the other hand, if the request does satisfy the security policy requirements ("Yes" at step S310), the processing proceeds to step S325. In step S325, the server 150 authenticates the client 110 and grants access by generating a security token. Next, in step S330, the security token is sent to the client 110.

Figure 4:
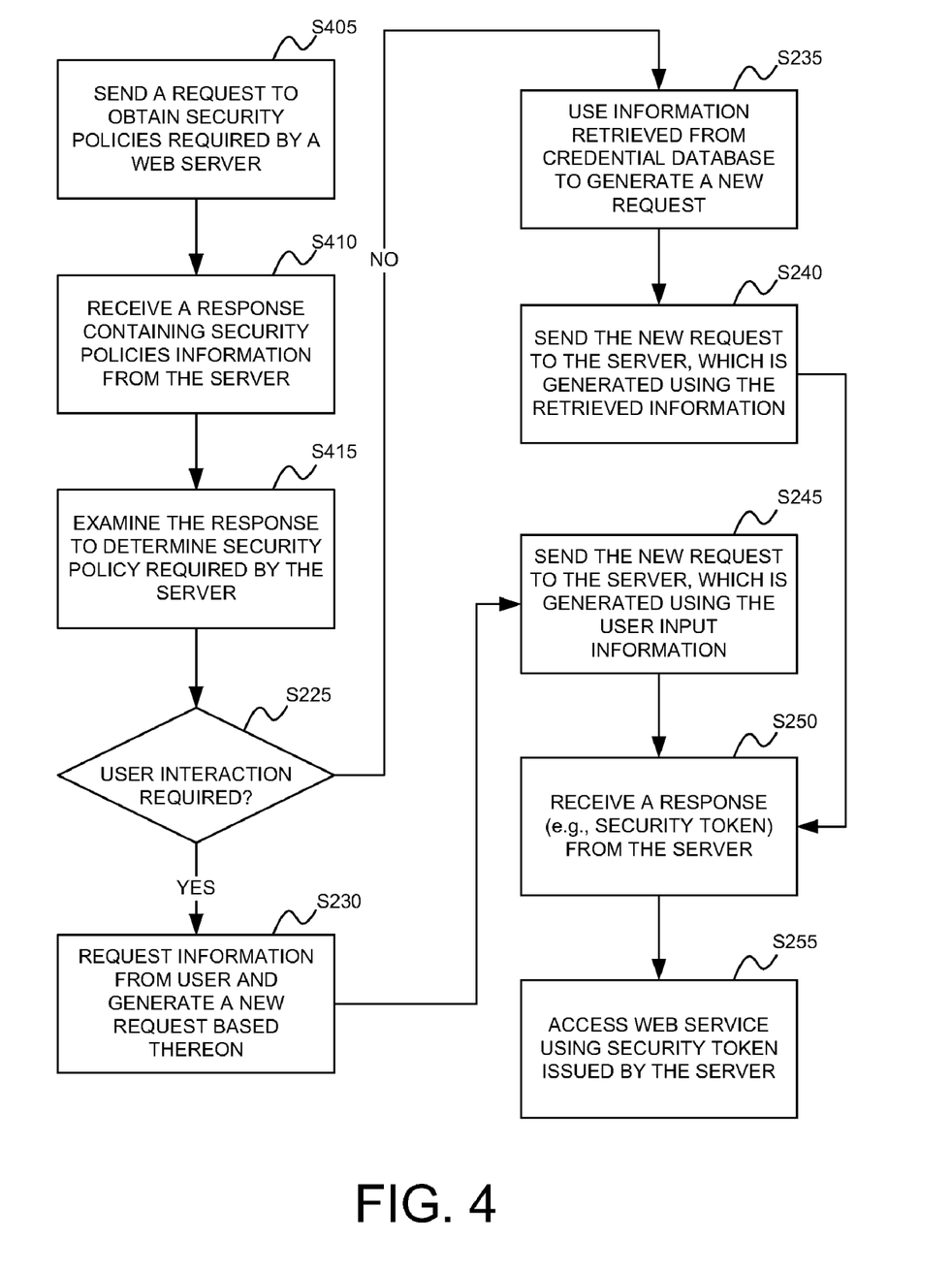
FIG. 4 is a flowchart diagram of operations performed by a client of the network system according to another embodiment of the present invention.

FIG. 4 is a flowchart illustrating operations performed by the client of the network system according to another embodiment of the present invention. It is noted that steps S225 through S255 illustrated in FIG. 4 are generally the same or similar as steps S225 through S255 illustrated and described with respect to FIG. 2. Accordingly, descriptions with respect to those steps S225 through S255 will be omitted.

In order for the client 110 to authenticate with the server 150, the client is configured to determine security policy information associated with a login application and/or a service executable by the server. In the embodiment illustrated in FIG. 4, security policy information of the server 150 is determined by generating and sending a request to obtain such information.

Accordingly, in step S405, the client generates and sends a request to the server to obtain security policy information. In response to the request, the server will generate and forward a response containing the requested information, such as, security requirements of a service (e.g., authentication, encryption, signature), and security requirements of the login application (e.g., types of authentication tokens accepted by login application and the claims associated with the authentication token).

In step S410, the client 110 receives the response returned by the server 150, which includes security policy information associated with the server. Next, in step S415, the policy discovery unit 120 of the client 110 examines the response to determine security policy defined by the Web server. Once security policy information has been determined, the authentication processing unit 122 of the client 110 uses the policy information to determine whether single-sign-on (SSO) is enabled or whether it needs to prompt the user for information needed to comply with the policy requirement.

Figure 5:
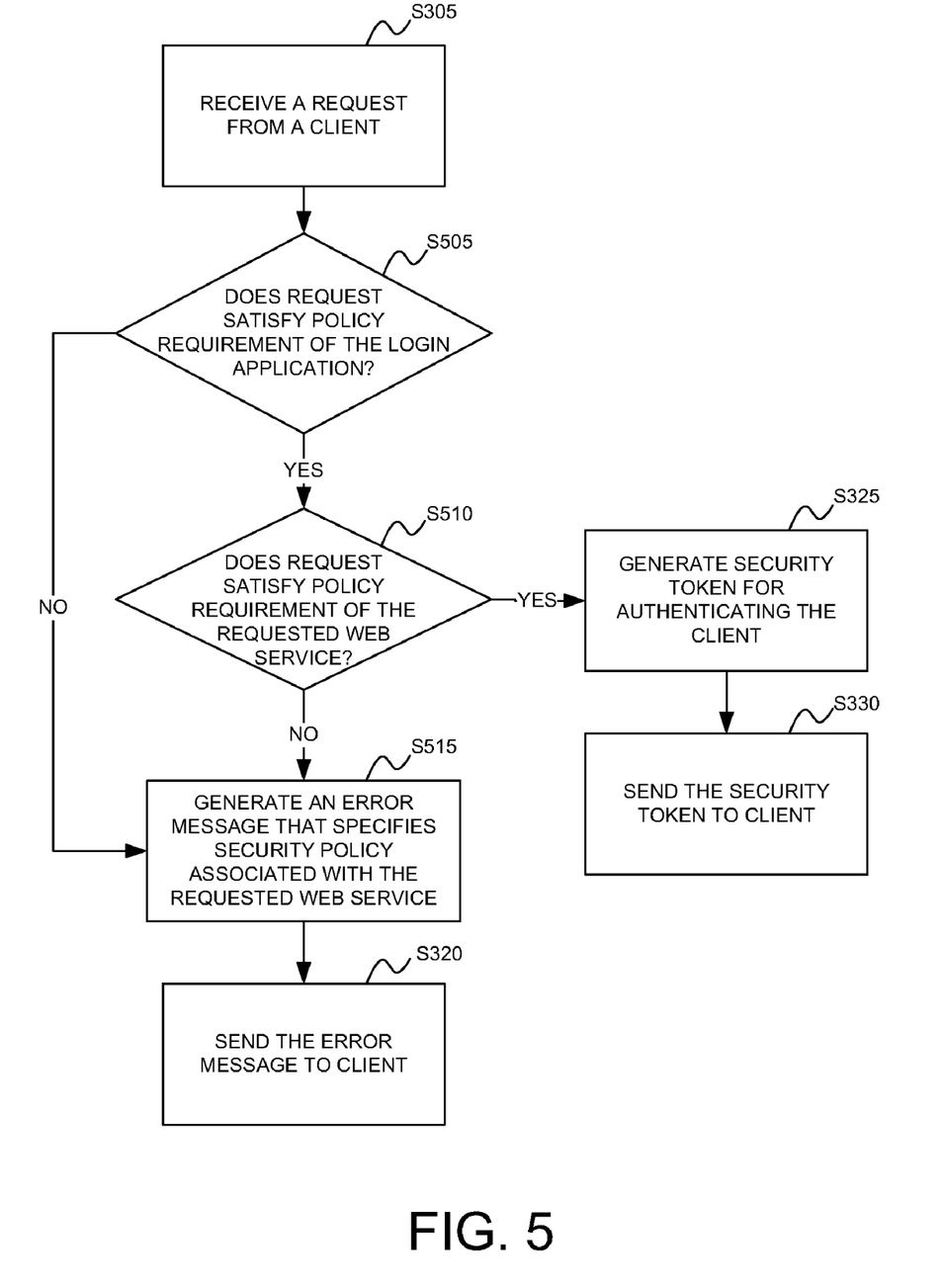
FIG. 5 is a flowchart diagram of operations performed by a server of the network system according to another embodiment of the present invention.

FIG. 5 is a flowchart illustrating operations performed by the server of the network system according to another embodiment of the present invention. It is noted that steps S320 through S330 illustrated in FIG. 5 are generally the same or similar as steps S320 through S330 illustrated and described with respect to FIG. 3. Accordingly, descriptions with respect to those steps S320 through S330 will be omitted.

In step S305, the server 150 receives a request (e.g., access request) transmitted by a client 110. Next, the server 150 communicates the received request to the login application currently executed thereby. As noted above, the server 150 may be capable of executing any one of a number of login applications and each of the login applications can have different security policy requirements associated therewith. Thus, depending on which login application is executed by the server, the security policy requirements for accessing the server may vary.

Accordingly, in step S505, the server 150 determines if the request satisfies the security policy associated with the login application currently executed by the server. If the request fails to satisfy the security policy defined by the login application ("No" at step S505), the processing proceeds to step S515 in which an error message is generated, which explicitly specifies the security policy information defined by the login application. Otherwise, if the request does satisfy the security policy defined by the login application ("Yes" in step S505), the processing proceeds to step S510.

In an embodiment, the request issued by the client 110 includes information identifying one of the services to which the client is seeking access. And, as noted above, each of the services can have different security policy requirements associated with them. Accordingly, in step S510, the login application determines if the request from the client satisfies the policy requirement of the service to which the client is seeking access. This is accomplished by the policy manager 154 looking up security policy information associated with the requested Web service stored in the policy table 160. The policy table 160 maintained by the login application 152 includes a set of security policies defined for each of the Web services 164, 166 executable by the server 150.

If the access request does satisfy the security policy requirement of the requested Web service ("Yes" in step S510), the processing proceeds to step S325 in which a security token for authenticating the client is generated.

On the other hand, if the access request does not satisfy the security policy requirements of the requested Web services ("No" in step S510), the processing proceeds to step S515 in which an error message is generated, which explicitly specifies security policy information regarding the Web service to which the client is seeking access.

Figure 6:
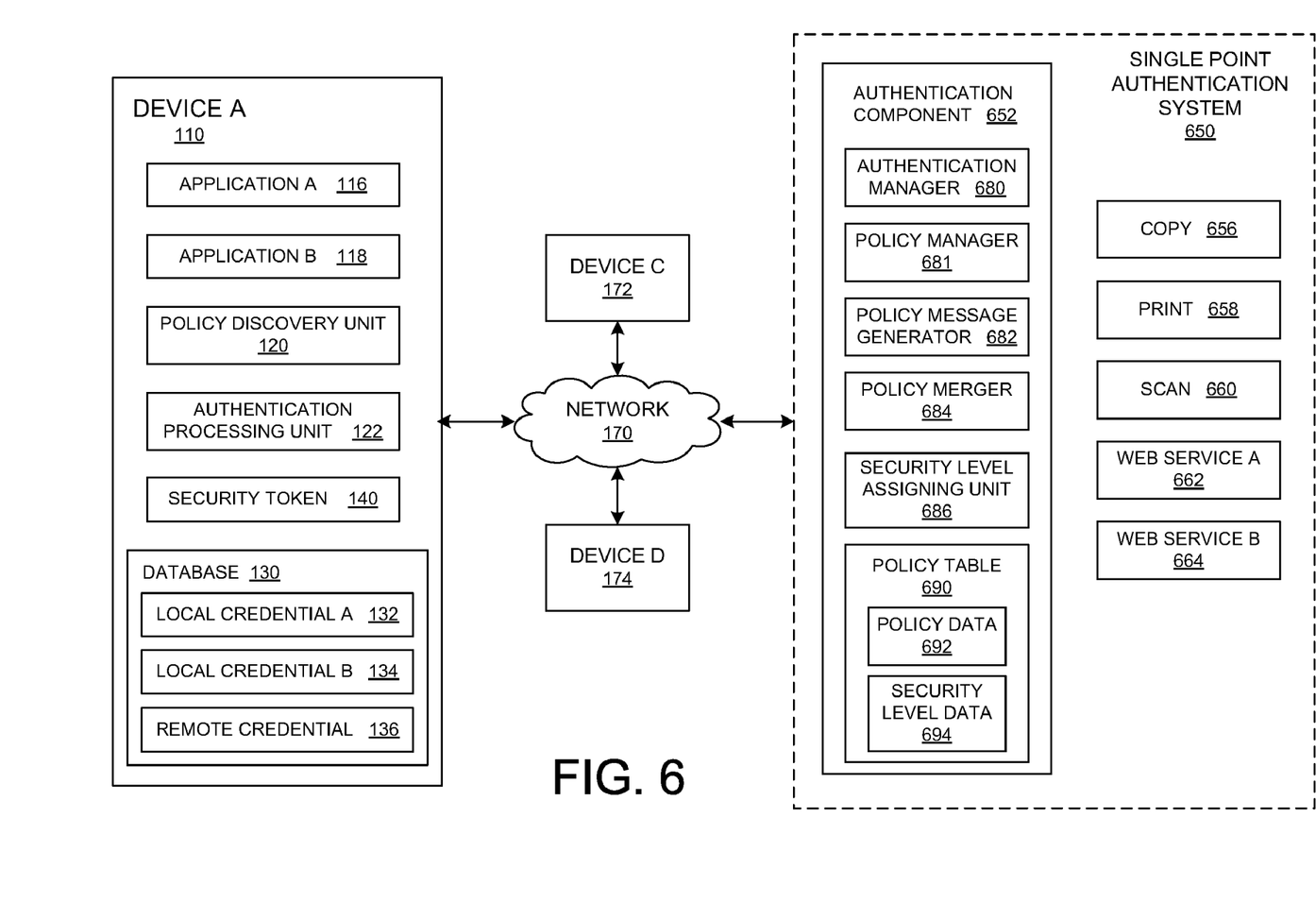
FIG. 6 is a block diagram of a network system including a single point authentication system according to an embodiment of the present invention.

FIG. 6 shows a network system including a single point authentication system 650 according to an embodiment of the present invention. Note that the network 170 and device A 110 serving as a client are similar to those in FIG. 1, therefore, detailed explanations of various functions and components thereof will be omitted with respect to FIG. 6. In FIG. 6, the network system includes a number of devices (e.g. device A, device B, device C) connected to a single point authentication system 650 via a network 170. The single point authentication system 650 may be realized by a server or a multi-function device (e.g., equipped with scanning, printing and/or copying functional units) or a combination of one or more servers and one or more multi-function devices. In an embodiment, the single point authentication system 650 includes a single point authentication component 652 (referred to herein as "authentication component" or "authentication unit") that is responsible for authenticating incoming credentials through various mediums (e.g., local, remote servlet, Web services, etc . . . ) into a system of a plurality of Web services 656, 658, 660, 662, 664.

In an embodiment, the authentication component 652 may require varying level of security policies that can be changed by an administrator of the single point authentication system 650. There are a number of security policies that can be specified by the authentication component 652, such as for example: (1) token types acceptable by the authentication component (e.g., KerberosToken, X509Token, SamlToken, etc.); (2) an encryption requirement (e.g., to specify whether encryption is required and type of encryption algorithm required); (3) a signature requirement (e.g., to specify whether signature is required and type of signature algorithm required); and (4) how the security token should be attached to the message.

Also included in the single point authentication system 650 are Web service applications and functions, each of which implements a particular service (Web service) that can be accessed by an external device. In the illustrated embodiment, the Web services provided by the single point authentication system 650 include a copy service 656, a print service 658, a scan service 660, and a number of other Web services 662, 664 (e.g., Web service A, Web service B). It is noted that, in an embodiment, the single point authentication system 650 is realized using a single device, wherein the authentication component 652 and the Web service applications and functions all reside in the same device (e.g., multi-function device equipped with scanning, printing and/or copying functional units). Alternatively, in another embodiment, the functional units (e.g., authentication component and the Web service applications and functions) are executed in separate devices.

According to an embodiment, the Web services provided by the single point authentication system 650 can have varying levels of security policies for different Web services. In this regard, the single point authentication system 650 defines security policies on a per Web service basis. Thus, depending on which Web service is requested by a client, the security policy requirements for accessing the requested Web service may vary. There are a number of security policies that can be required by each of the Web services 656 through 664 executable by the single point authentication system 650, such as for example: (1) token types acceptable by a respective Web service (e.g., KerberosToken, X509Token, SamlToken, etc.); (2) an encryption requirement (e.g., to specify whether encryption is required and to specify which parts of a message need to be encrypted); (3) a signature requirement (e.g., to specify whether signature is required and which parts of a message need to be signed); and (4) how the security token should be attached to the message. It is noted that, in an embodiment, although each of the Web services may specify different security policies different from the authentication component, the security policies associated with each Web service are required to be a subset of the security policies acceptable by the authentication component. In particular, in an embodiment, security token types acceptable by a Web service is required to be a subset of security token types acceptable by the authentication component.

As shown in FIG. 6, the authentication component 652 includes an authentication manager 680, a policy manager 681, a policy message generator 682, a policy merger 684, a security level assigning unit 686 and a policy table 690. The policy manager 681 is configured to enforce the security policies of the authentication component 652 and the security policies of the Web services accessible via the authentication component.

In an embodiment, the authentication manager 680 receives an incoming request from an external device (e.g., client 110) and examines it to determine if the request satisfies the security policy requirements of the authentication component 652. In an embodiment, the policy table 690 is referenced by the authentication manager 680 to acquire the information associated with security policies defined by the authentication component and the authentication manager 680 makes a determination of whether or not the incoming request satisfies the policy requirements of the authentication component based on the acquired information. In cases where the Web services 656 through 664 provided by the single authentication system 650 are assigned different security policies than that of the authentication component 652, the authentication manager 680 is configured to determine if an incoming request satisfies policy requirements of a requested Web service by looking up policy requirement information associated with the requested Web service stored in the policy table 690. Accordingly, the policy table 690 includes policy data 692 defining a set of security policies for each of the Web services 656-664 and for the authentication component 652.

According to an embodiment, the security level assigning unit 686 is configured to assign a security level associated with a security policy (e.g., security token type) acceptable by the authentication component 652 and a security level associated with a security policy (e.g., security token type) of each of the Web services 656-664. The security level information generated by the security level assigning unit 686 is stored in the policy table 690 as security level data 694. According to an embodiment, the security level data 694 stored in the policy table 690 is used by the policy merger 684 to merge the security token requirements of the authentication component 652 and Web services.

According to an embodiment, the policy merger 684 is configured to merge the security policies acceptable by the authentication component 652 with the security policies acceptable by the requested Web service to generated merged security policy information (also referred to herein as "merged security policy file"). Accordingly, the merged security policy information identifies security policies acceptable by both the authentication unit and a respective Web service.

According to an embodiment, the policy message generator 682 is configured to generate a policy message including the merged security policy information identifying security policies acceptable by both the authentication component and the requested Web service and to send the policy message to a client seeking access. In operation, a policy message may be generated by the policy message generator 682 in response to an incoming service request from a client that does not satisfy security policies of the authentication component and/or security policies of a requested Web service. Additionally, a policy message may also be generated by the policy message generator 682 in response to a security policy discovery request from a client seeking to obtain security policies requirements for accessing a particular Web service.

In an embodiment, during a security policy retrieval process of a Web service the following operations occur. First, a client requests from a Web service its security policy. This can be done through standard means such as WS-MetadataExchange or an out-of-band method. The authentication component 652 will specify security tokens that it will accept for inbound Web service requests into the single point authentication system 650 and make them available. During the process of retrieving the Web service's security-policy, the policy merger 684 may merge the security policies defined by the authentication component 652 with the security policies specified by a requested Web service so that the client receives the correct settings in the expected format. The security policy discovery process usually takes place during Web service discovery process but may also occur after the Web service has been discovered during run time.

Figure 7:
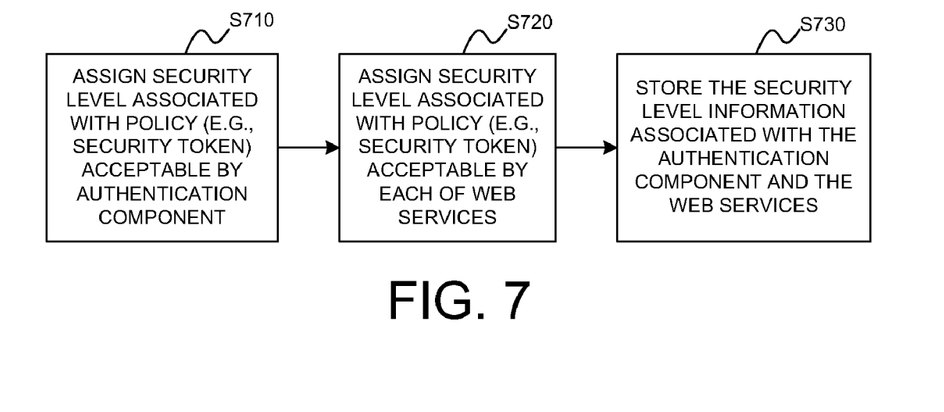
FIG. 7 is a flowchart diagram illustrating operations performed by a single point authentication component according to an embodiment of the present invention.

FIG. 7 is a flowchart illustrating operations performed by the single point authentication system 650 according to an embodiment of the present invention. In step S710, the security level assigning unit 686 of the authentication component 652 assigns a security level associated with a security policy (e.g., security token type) acceptable by the authentication component. Similarly in step S720, the security level assigning unit 686 assigns a security level associated with a security policy (e.g., security token type) acceptable by each of the Web services 656 through 664 provided by the single point authentication system 650. Then in step S730, the security level data 694 associated with the authentication component 562 and the Web services 656 through 664 are stored in the policy table 690. As noted above, the security level data 694 stored in the policy table 690 may be used by the authentication component 652 (i.e., policy merger 684) when merging security policies acceptable by the authentication component with security policies acceptable by a Web service.

Figure 8:
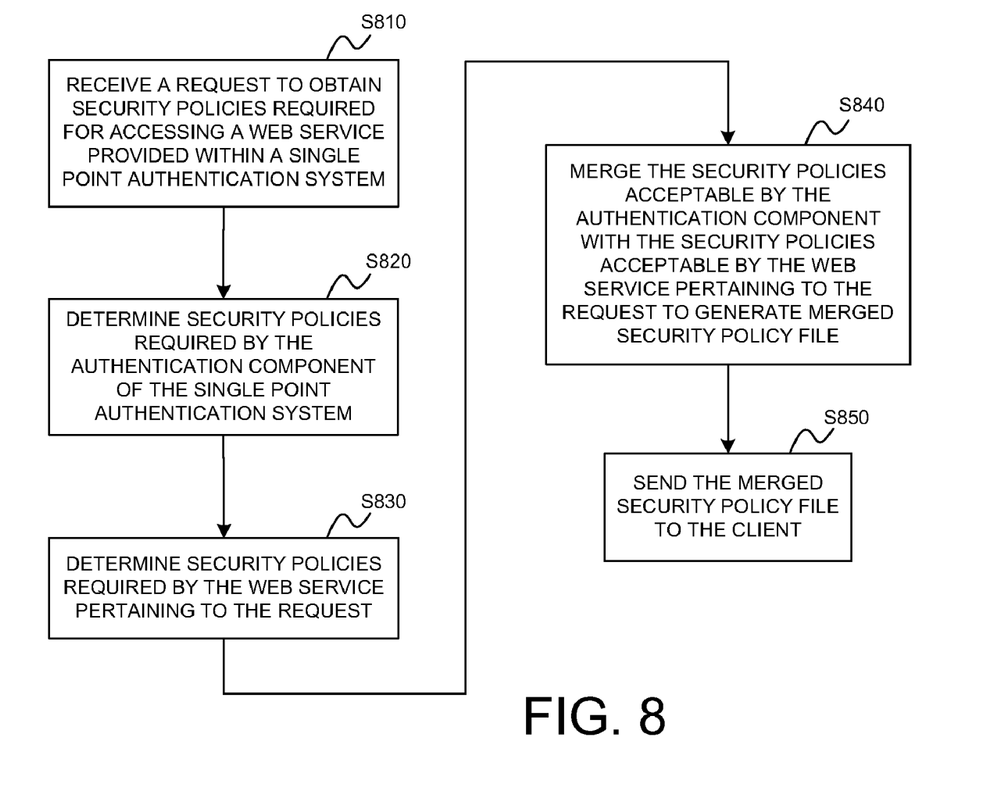
FIG. 8 is a flowchart diagram illustrating operations performed by a single point authentication component during a security policy retrieval process according to an embodiment of the present invention.

FIG. 8 is a flowchart illustrating operations performed by the authentication component 652 during a security policy retrieval process according to an embodiment of the present invention. In step S810, the authentication component 652 receives a request (e.g., from a client) to obtain security policies required for accessing a Web service provided within a single point authentication system. Then in step S820, security policies required by the authentication component is determined. Additionally in step S820, the security level(s) associated with the security token type(s) acceptable by the authentication component may also be determined. Similarly in step S830, security policies required for accessing the Web service is determined. Additionally in step S830, the security level associated with the security token type acceptable by the Web service may also be determined.

Then, in step S840, the policy merger 684 merges the security policies acceptable by the authentication component with the security policies acceptable by the requested Web service to generate merged security policy file. Then, in step S850, the merged security policy file is returned to the client. During the merging process, if a security token type is specified for the Web service, the policy merger will determine if the security token type acceptable by the Web service matches one of the security token types acceptable by the authentication component. If the security token type does match, the policy merger will include information regarding the security token type acceptable by the Web service in the merged security policy file. On the other hand, if the security token type acceptable by the Web service does not match one of the security token types acceptable by the authentication component, the policy merger will select one of the security token types acceptable by the authentication component that is assigned a higher security level than the security level assigned to the security token type acceptable by the Web service to be included in the merged security policy file.

Figure 9:
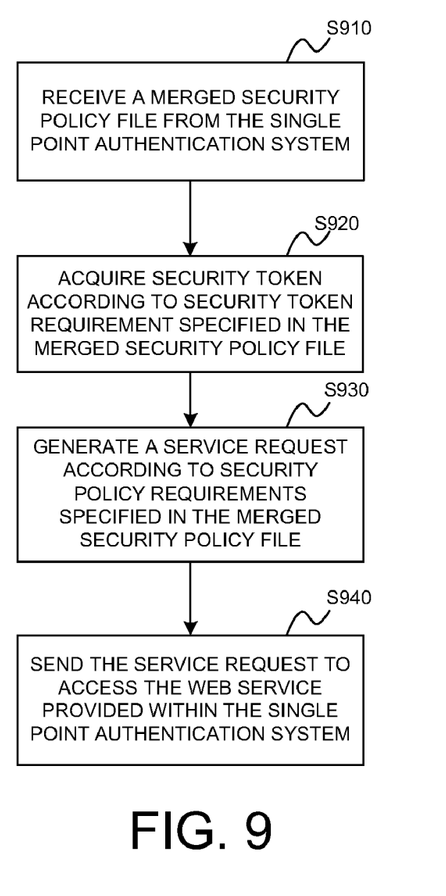
FIG. 9 is a flowchart diagram illustrating operations performed by a client to generate a service request for accessing a Web service executed within a single point authentication system according to an embodiment of the present invention.

FIG. 9 is a flowchart diagram illustrating operations performed by the client to generate a service request for accessing a Web service executed within the single point authentication system according to an embodiment of the present invention. In response to a security policy retrieval request, in step S910, the client receives the merged security policy file from the authentication component 652 that specifies the security policy requirements for accessing one of the Web services offered by the single point authentication system. Based on an examination of the merged security policy file, if it is determined that a security token is required for accessing the Web service, the client acquires a security token according to security token requirement specified in the merged security policy file in step S920. Then in step S930, the client generates a service request according to security policy requirements specified in the merged security policy file. There are a number of security policies that can be specified in the merged security policy file including, but not limited to, (1) acceptable token types; (2) the type of encryption algorithm required to be used; (3) which parts of the message need to be encrypted; (3) the type of signature algorithm required to be used; (5) which parts of the message need to be signed; and (6) how the security token is required to be attached to the message. Once the service request message complying with the security policy requirements specified in the merged security policy file has been generated, the service request is transmitted to the single point authentication system executing the respective Web service in step S940. According to an embodiment, incoming service requests to access any one of the Web services executed within the single point authentication system are intercepted and processed by the authentication component 652.

Figure 10:
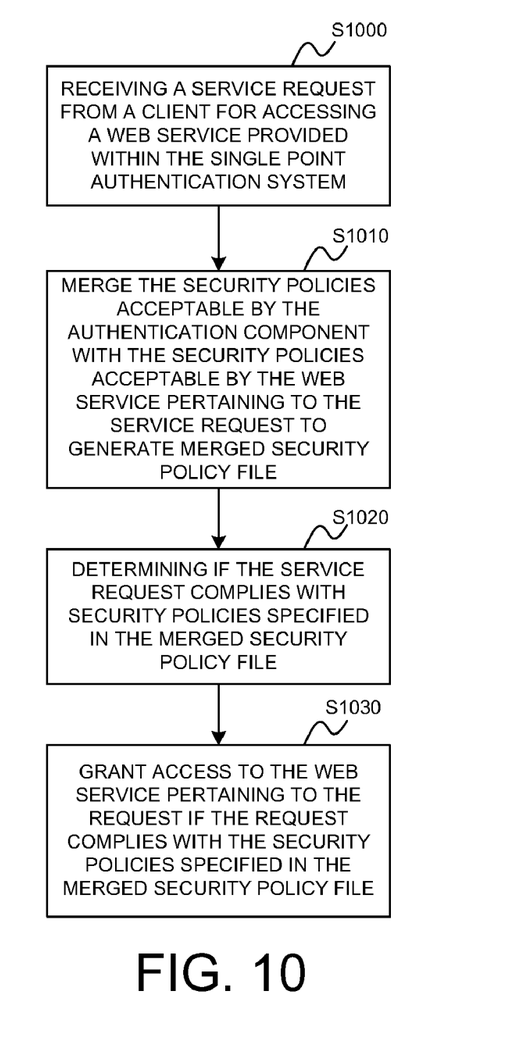
FIG. 10 is a flowchart diagram illustrating operations performed by a single point authentication component to process a service request received from a client according to an embodiment of the present invention.

FIG. 10 is a flowchart diagram illustrating operations performed by the single point authentication component to process a service request received from the client according to an embodiment of the present invention. In step S1000, the authentication component receives a service request from the client for accessing one of the Web services executed within the single point authentication system. In an embodiment, the service request is processed by an authentication manager 680 included in the authentication component. Prior to processing the service request, the security policies acceptable by the authentication component are merged with the security policies acceptable by the Web service pertaining to the service request to generate merged security policy file in step S1010. Then, in step S1020, based on the data contained in the merged security policy file, the authentication manager 680 determines if the service request complies with the security policy requirements for accessing the Web service. Finally, in step S1030, the authentication manager grants access to the Web service pertaining to the service request if it is determined that the service request complies with the security policy requirements specified in the merged security policy file.

In an embodiment, the single point authentication system is configured such that an administrator can override Web service security policy definitions and specify that the security policies of the authentication component is required to be followed. In an embodiment, by default the security policies of the authentication component are the policies for the entire single point authentication system and all Web services running within the single point authentication system. The administrator has the option of disabling this feature and specifying security policies for each Web service.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:
1. A system comprising:
at least one processor programmed to control one or more of:
a first Web service unit configured to provide a first Web service, the first Web service unit is associated with a first security policy for accessing the first Web service;

a second Web service unit configured to provide a second Web service, the second Web service unit is associated with a second security policy for accessing the second Web service;
an authentication unit configured to enforce the first security policy of the first Web service unit and the second security policy of the second Web service unit;
a policy merger configured to merge the authentication unit security policy acceptable by the authentication unit with a security policy acceptable by a requested Web service to generate merged security policy information; and
a policy message generator configured to generate a message including the merged security policy information,
wherein the authentication unit defines an authentication unit security policy acceptable by the authentication unit for inbound Web service requests,
wherein the authentication unit is a single point authentication component, and the authentication unit authenticates access to the first Web service if a request to access the first Web service is received from a client, and authenticates access to the second Web service if a request to access the second Web service is received from the client,
wherein the first security policy of the first Web service is different than the second security policy of the second Web service, and
wherein the merged security policy information identifies a security token acceptable by both the authentication unit and the requested Web service.

2. The system of claim 1, further comprising:
a security level assigning unit configured to assign a security level associated with the authentication unit security policy acceptable by the authentication unit, to assign a security level associated with the first security policy for accessing the first Web service, and to assign a security level associated with the second security policy for accessing the second Web service.

3. The system of claim 1, further comprising:
a policy message generator configured to generate a message including information regarding the authentication unit security policy acceptable by the authentication unit and at least one of the first and second security policies acceptable by one of the Web services pertaining to a request.

4. A method comprising:
using at least one processor to perform the following:
determining a first security policy acceptable for accessing a first Web service;
determining a second security policy acceptable for accessing a second Web service;
enforcing the first security policy of the first Web service and the second security policy of the second Web service using an authentication unit, and
merging the authentication security policy acceptable by the authentication unit with at least one of the first and second security policies acceptable by a requested Web service to generate merged security policy information,
wherein the authentication unit defines an authentication unit security policy acceptable by the authentication unit for inbound Web service requests,
wherein the authentication unit is a single point authentication component, and the authentication unit authenticates access to the first Web service if a request to access the first Web service is received from a client, and authenticates access to the second Web service if a request to access the second Web service is received from the client,
wherein the first security policy of the first Web service is different than the second security policy of the second Web service, and
wherein the merging comprises identifying a security token acceptable by both the authentication unit and the requested Web service.

5. The method of claim 4, further comprising:
assigning a security level associated with the authentication unit security policy acceptable by the authentication unit;
assigning a security level associated with the first security policy for accessing the first Web service; and
assigning a security level associated with the second security policy for accessing the second Web service.

6. An apparatus comprising:
at least one processor programmed to control one or more of:
a request receiving unit configured to receive a request from a client for accessing a first Web service or a second Web service;
a policy determination unit configured to determine a first security policy acceptable for accessing the first Web service and to determine a second security policy acceptable for accessing the second Web service;
an authentication unit configured to enforce the first security policy of the first Web service and the second security policy of the second Web service; and
a policy merger configured to merge the authentication unit security policy acceptable by the authentication unit with the security policy acceptable by the requested Web service to generate merged security policy information,
wherein the authentication unit defines an authentication unit security policy acceptable by the authentication unit for inbound Web service requests,
wherein the authentication unit is a single point authentication component, and the authentication unit authenticates access to the first Web service if a request to access the first Web service is received from a client, and authenticates access to the second Web service if a request to access the second Web service is received from the client,
wherein the first security policy of the first Web service is different than the second security policy of the second Web service,
wherein the merged security policy information identifies a security token acceptable by both the authentication unit and the requested Web service.

7. The apparatus of claim 6, further comprising:
a security level assigning unit configured to assign a security level associated with the authentication unit security policy acceptable by the authentication unit, to assign a security level associated with the first security policy for accessing the first Web service, and to assign a security level associated with the second security policy for accessing the second Web service.

* * * * *